March 29, 1927.
A. C. FISCHER
1,622,311
DEFORMABLE EXPANSION CONTRACTION JOINT
Filed Feb. 20, 1926
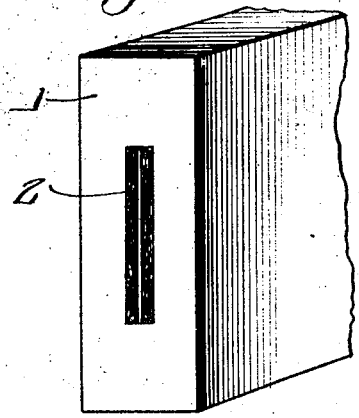
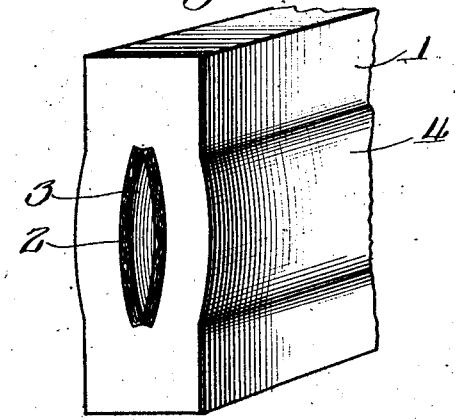
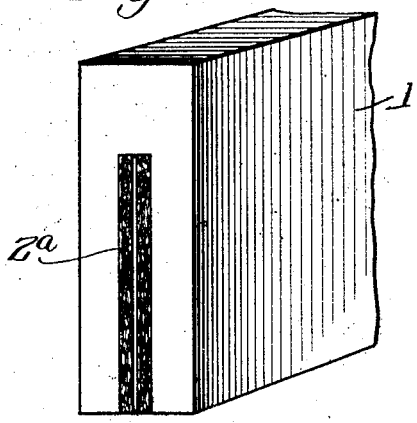
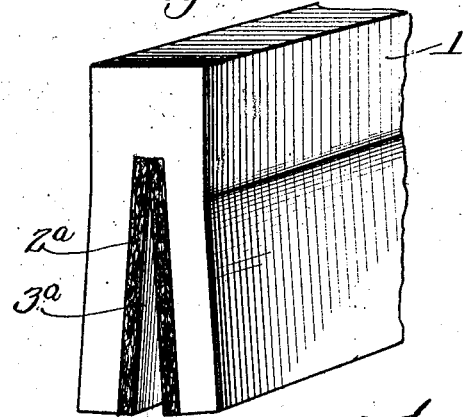
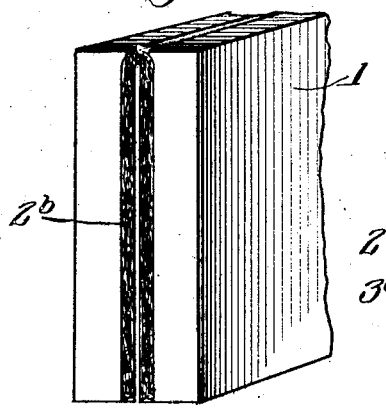
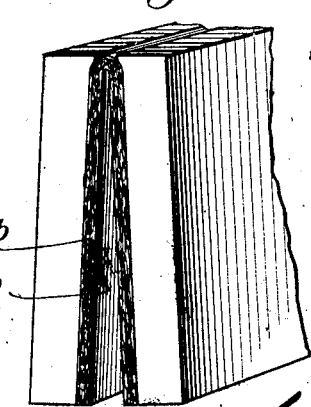
Inventor
Albert C. Fischer,
By William S. Knight, atty.

Patented Mar. 29, 1927.

1,622,311

UNITED STATES PATENT OFFICE.

ALBERT C. FISCHER, OF CHICAGO, ILLINOIS.

DEFORMABLE EXPANSION-CONTRACTION JOINT.

Application filed February 20, 1926. Serial No. 89,773.

My invention relates in general to expansion-contraction joints for use in masonry, and the like construction, and has particular reference to a joint of this character for use in roadways, pavements, and other constructions, to compensate for the expansion and construction of slabs or sections of concrete, or other material subject to changing dimensions due to climatic or other existing conditions.

In the accompanying drawing I have selected several forms for the purpose of illustrating the application of the invention, and in said drawing Fig. 1 is a perspective view of a portion of an expansion-contraction joint constructed in accordance with one form of my invention; Fig. 2 is a view similar to Fig. 1 but showing the joint transversely extended; Fig. 3 is a perspective view of a portion of the joint showing another form of my invention; Fig. 4 is a view similar to Fig. 3, showing this form of the joint transversely extended; Fig. 5 is a perspective view of a portion of a joint showing still another form of the invention; Fig. 6 is a view similar to Fig. 5 and showing this particular form of the joint transversely extended; Fig. 7 is a sectional view of a pair of slab sections illustrating the application of the joint.

Referring now to the drawing in detail —1— represents a preformed strip which I will ordinarily produce from some plastic material suitable for the purpose, such for instance as bituminous matter, preferably in the form of blown asphalt, the same having dimensions making it adaptable for expansion-contraction joint purposes between slabs of concrete and other material which is subject to expansion and contraction.

As in the case of any expansion joint the present invention is intended to compensate for expansion and contraction of the slab sections between which it is disposed, and the salient feature of my present invention is to make this joint more susceptible to changes in transverse dimensions without weakening or sacrificing the necessary qualities of the joint.

First I would make it clear that the plastic material of the joint above referred to may be mixed or incorporated with strengthening or reinforcing materials, such as, various kinds of fibrous matter, should occasion demand. In any event the outstanding feature of the invention resides in incorporating an internal spreading insert —2— in the body of the joint, so as to enable the joint to compensate for contraction of one or both of the slab sections between which it is disposed.

This insert may be constructed in various ways and of various materials, as a pertinent example I will refer to felted layers, or rather layers of felted material. As shown in Figs. 1 and 2 I have adopted a pair of these felted layers and enveloped the same centrally of the strip, with the same extending longitudinally of the strip. The outside surface of these layers should be securely bonded to the material of the strip by either adhering the same thereto, or by some other means that will effect a secure attachment.

The confronting inner faces of these layers are non-adhering so as to enable them to readily spread apart to leave a space —3— between them, as shown in Fig. 2. This spreading of the layers is effected when the slab sections between which the joint is disposed contract and pull the walls of the joint with them so that the same bulges, shown as at —4— in Fig. 2. The construction of assembly of the layers does not induce the bulging of the joint, but on the other hand simply permits the sides of the joint to extend transversely when the sides of the joint to extend transversely when the slab sections contract. In other words, the sides of the joint are securely bonded to the slab sections, and when the slab sections contract the tendency is to pull the joint apart. Were it not for the means which I have provided to compensate for this effect the tendency would be to rupture the joint or else separate the sides of the same from the walls of the slab sections, leaving spaces or cracks which would be filled up by water, dust or dirt, thus destroying the properties of the joint.

The same advantages as described with reference to the form shown in Figs. 1 and 2 may be realized with the embodiment shown in Figs. 3 and 4. In this form, however, I would make the felted layers 2ª longer, so that they would extend to the base of the joint. When extended transversely this form of joint would leave a triangular space 3ª between the confronting faces of the layers, and a somewhat different dimension on the outside of the joint from that of the bulge —4— (Fig. 2). It should be considered, however, that deformities in the joints shown are somewhat exaggerated. In reality the bulges or transverse extensions of the joint would not be as severe as shown.

In Figs. 5 and 6 I have shown a form in which the felted layers 2$^b$ extend from the top to the base of the joint. When this form of joint is extended transversely the space between the layers represents a slot 3$^b$ as wide at the top as it is at the bottom. It will also be noted that the felted layers are produced from one sheet, folded upon itself, the fold preventing dirt from filling the space 3$^b$ when the joint is extended.

Fig. 7 illustrates a pertinent example of the application of the invention, in which the joint —1—, described with reference to Figs. 5 and 6, is disposed between concrete slab sections A and B, the joint being extended transversely as if the slab sections A and B were contracted.

Upon expansion of the slab sections A and B the joint would be contracted due to pressure, and when contracted would assume a dimension as illustrated in Fig. 1, Fig. 3 and Fig. 5, with the layers 2, 2$^a$ and 2$^b$ pressed together, but always ready to permit the joint to bulge or extend transversely, due to the fact that their contacting surfaces are non-adhering.

What really happens in a joint constructed in this way is simply the provision of a non-adhering space or wall extending longitudinally of the joint. Without using some means of covering or protecting the confronting faces of the wall they would adhere together and defeat the purpose of the joint. For this reason layers of some suitable material are inserted so as to insure non-adhering inner confronting faces. The construction comprises a deformable expansion-contraction joint, having internal longitudinally divided non-adhering vertical walls.

Of course it is also realized that the incorporation of layers within the joint performs the desirable function of a reinforcing means for the joint, so that it can easily be said that the insert performs a dual purpose.

I claim:

1. A deformable expansion-contraction joint, comprising a plastic strip having internal longitudinally divided non-adhering vertical walls, said walls adapted to expand and contract for increasing or decreasing the transverse dimension of the strip.

2. An expansion-contraction joint, comprising a deformable strip having internal longitudinally divided, vertical contacting walls, said walls adapted to spread apart for increasing the transverse dimension of the strip.

3. An expansion-contraction joint, comprising a deformable strip having internal longitudinally divided, vertical contacting walls, said walls adapted to spread apart for increasing the transverse dimension of the strip, the contacting surfaces of said walls being non-adhering substantially as and for the purpose described.

4. A deformable expansion-contraction joint, comprising a plastic strip, having internal longitudinally divided vertical walls, and non-adhesive protective layers bonded to said walls with their inner surfaces in contacting confronting relating, said walls adapted to spread apart for increasing the transverse dimensions of the strip.

5. An expansion joint, consisting of two walls of elastic waterproofing material cemented to the outside faces of a folded sheet, the walls being movable outwardly from the folded edge of said sheet.

6. Two non-adhering sheets placed face to face (preferably of rectangular form) surrounded by bituminous or other suitable material, separable along their inner contacting faces and adapted to be used as an expansion joint.

7. Two non-adhering sheets placed face to face, partially surrounded by bituminous or other suitable material, separable along the inner contacting faces, adapted to be used as an expansion joint.

Signed at Chicago, Illinois, this 18 day of Feb., 1926.

ALBERT C. FISCHER.